A. C. KIRSHNER.
CREDIT SLIP AUTHORIZING APPARATUS.
APPLICATION FILED DEC. 19, 1919.
1,385,788.
Patented July 26, 1921.
2 SHEETS—SHEET 1.
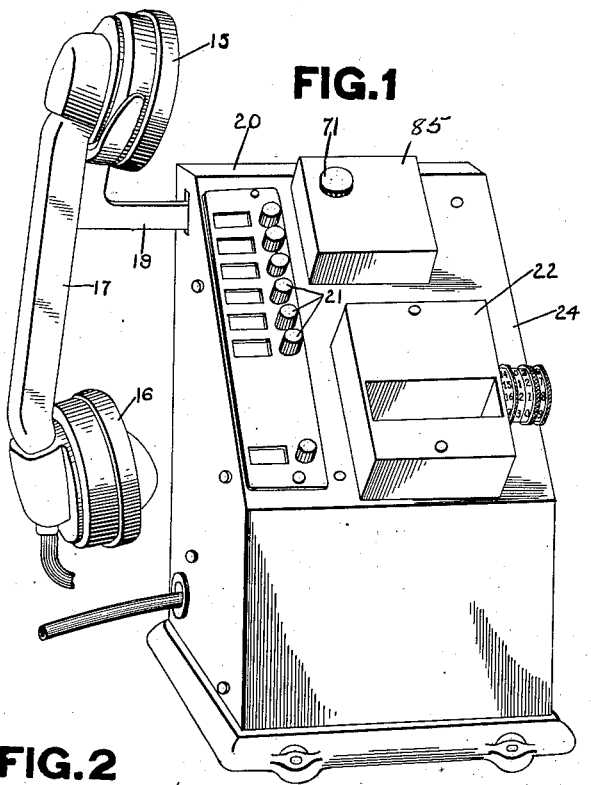
FIG. 1
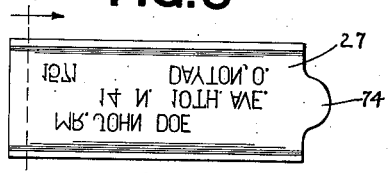
FIG. 5
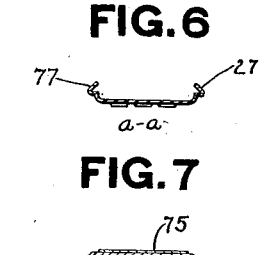
FIG. 6
FIG. 7
FIG. 2
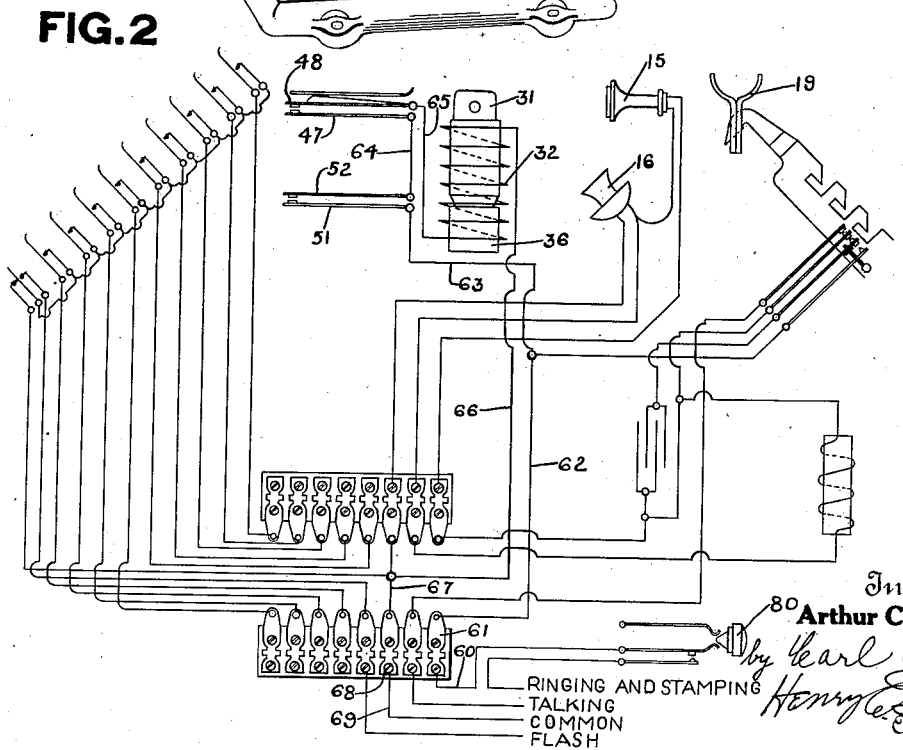
Inventor
Arthur C. Kirshner
by Karl Benst
Henry E. Stauffer
Attorneys A. C. KIRSHNER.
CREDIT SLIP AUTHORIZING APPARATUS.
APPLICATION FILED DEC. 19, 1919.
1,385,788.
Patented July 26, 1921.
2 SHEETS—SHEET 2.
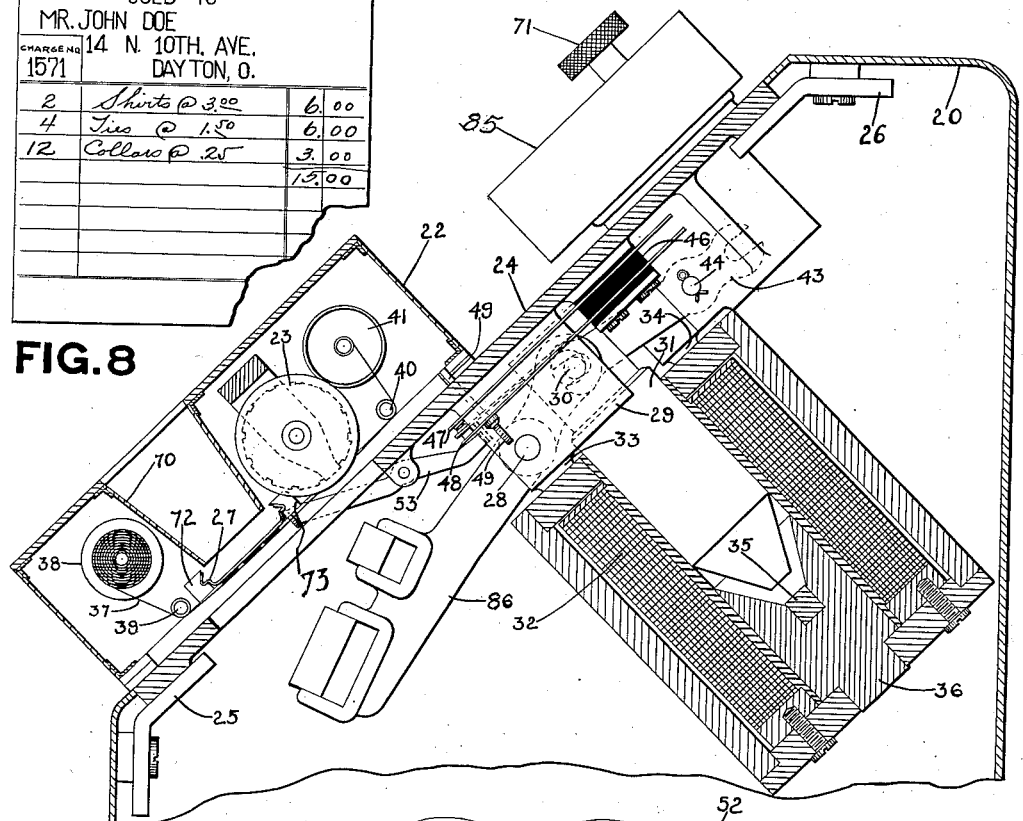
FIG. 3
FIG. 8
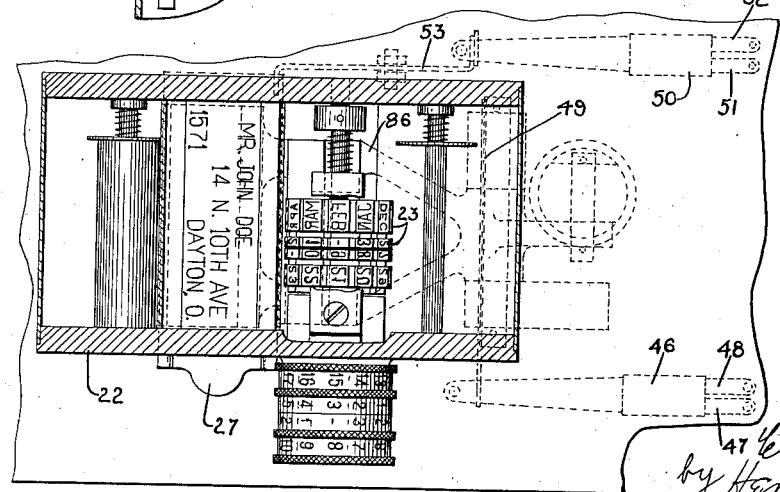
FIG. 4
Inventor
Arthur C. Kirshner

UNITED STATES PATENT OFFICE.

ARTHUR C. KIRSHNER, OF DAYTON, OHIO, ASSIGNOR TO THE NATIONAL CASH REGISTER COMPANY, OF DAYTON, OHIO.

CREDIT-SLIP-AUTHORIZING APPARATUS.

1,385,788.   Specification of Letters Patent.   Patented July 26, 1921.

Application filed December 19, 1919. Serial No. 346,145.

*To all whom it may concern:*

Be it known that I, ARTHUR C. KIRSHNER, a citizen of the United States, residing at Dayton, in the county of Montgomery and State of Ohio, have invented certain new and useful Improvements in Credit-Slip-Authorizing Apparatus, of which I declare the following to be a full, clear, and exact description.

This invention relates to store service systems and has more particular relation to means for authorizing credit sales.

The principal object of the present invention is to provide means carried by the customer to identify himself.

Another object is to provide means whereby a credit sale may not be authorized without the identifying means.

A further object is to print the customer's name and address and other appropriate information on the sales slip.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Of said figures:

Figure 1 is a reduced perspective view of the clerks' telephone and stamping device.

Fig. 2 is a diagram of the electrical connections of the clerks' telephone and stamping device.

Fig. 3 is a sectional view through the clerks' telephone and stamping device and shows the means whereby the sales slip is stamped and punched on a credit transaction.

Fig. 4 is a detail top plan view of the stamping mechanism and shows the mechanical means by which the circuit controlling the stamping is closed.

Fig. 5 is a detail view of the identifying device to be carried by the customer.

Fig. 6 is a cross section taken on the line A—A of Fig. 5, looking in the direction of the arrows.

Fig. 7 is a modified form of identifying plate on which the customer's name and address are engraved instead of being stamped as in the plate shown in Fig. 6.

Fig. 8 is a detail view of the type of slip adapted to be printed by the clerks' stamping device.

The present invention is shown applied to the credit slip authorizing apparatus which is shown and described in Letters Patent of the United States, No. 1,321,900, granted November 18th, 1919, to Herbert G. Dorsey and Arthur C. Kirshner, and reference is made thereto for a full and complete description of the said apparatus. However, a brief description of the system in which the apparatus shown in the Dorsey and Kirshner patent is used, will be included here for the purpose of making the present invention more easily understood. The system includes telephonic and other means of electrical communication between a clerk and the person who is authorized to extend credit, as well as an electrically operated mechanism under control of the credit man for printing on and punching an inserted sales slip. The complete transaction is as follows.

When a customer desires credit, the clerk fills out a sales slip with the customer's name, address and other appropriate information and then depresses one of a plurality of keys, located in the punching mechanism. The depression of this key through suitable electrical connections lights a lamp in a switchboard at the credit authorizer's station informing him that communication is desired. He then gets into telephonic communication with the clerk who informs him of the name of the customer desiring credit. The clerk then inserts the sales slip into the machine, the slip closing the contact which lights a light on the switchboard at the authorizer's station indicating that the sales slip is in position to be stamped. If the credit is to be extended, the authorizer then presses a key which through suitable connections to be described later, actuates the stamping and punching means.

It can be seen from the above that while it is possible to give the clerk authorization before she completes a sale on credit, unless she knows the customer personally, there is nothing to prevent any one from charging goods under the name of some one else who is known to be a patron of the store.

The present invention is designed to make this impossible by providing each regular customer with a means of identification. The means shown and described herein comprises a plate of some appropriate material in which the name, address and customer's number is pressed. Such a plate is carried by the customer and is presented by her to the clerk when it is desired to purchase on credit. The plate is designed to be inserted in a slot in the stamping telephone, and when the stamping device is operated by the credit authorizer, prints the name, address, and customer's number on the slip, in addition to the date and clerks' station number which are printed by the type wheels carried in the stamping device. Mechanism is also provided to enforce the insertion of the customer's identification plate before the stamping mechanism can be actuated.

The clerks' telephone and stamping device will now be described. It comprises a receiver 15 and a transmitter 16 mounted upon opposite ends of a handle or grip 17. When not in use it is carried by a hook 19 pivotally mounted near the top of a casing 20. Slidably mounted in the casing 20 are a plurality of keys 21, the depression of any one of which is adapted, through suitable electrical connections, to light a lamp on a credit authorizer's switchboard to indicate that communication is desired. As the above devices form no part of the present invention and are fully shown and described in the Dorsey and Kirshner patent, no further description thereof will be included herein.

The sales slip to be stamped is inserted under a frame 22 (Figs. 1 and 3) in which are supported the date wheels 23 (Fig. 4). The frame 22 is mounted on a plate 24 and supported by brackets 25 and 26 fast on the cabinet 20. A plate 27 (Figs. 5 and 6) of thin sheet metal, has its edges bent to form angles 77 which coöperate with the sides of the slots formed in members 72 and 73, into which it is adapted to be inserted. The plate 27 in the preferred form carries type which is formed thereon by the well known method used in connection with the addressograph. A projection 74 on the right hand end (Fig. 5) of the plate is for the purpose of grasping the plate to insert it into and remove it from the machine.

This form of plate is of course only illustrative and in Fig. 7 a different form is shown. In this form the plate has a solid body on the face of which the type may be engraved or formed in any other desired manner. On the back of this type of plate there is fastened a thin plate 75 which has the same information thereon that is printed by the type. This information is visible when the plate is in the marking device through the opening 70 therein. A platen lever 26 (Figs. 3 and 4) is operated under the control of the credit authorizer to carry the sales slip against a customer's identification plate 27 and the date type carriers 23, the printed impression on the slip showing that the credit is authorized. The platen lever 26 is loose on a cross rod 28 mounted on depending portions 29 of the plate 24, and its rear end is provided with an opening through which a pin 30, mounted in the upper end of a core 31 of a solenoid 32, projects. The solenoid 32 is mounted on the depending portions 33 and 34 of the plate 24. When a credit is to be extended the credit authorizer closes a circuit which energizes the solenoid 32 whereupon the core 31 is drawn down to operate the platen lever 26 to make a printed impression on the sales slip from the customer's identification plate 27 and the date type carriers 23 as shown in Fig. 8. An opening 70 is made in the frame 22 just over the slot therein, in which the customer's identification plate 27 is inserted. By looking through this opening the clerk is able to look at the back of the plate and read the name of the customer before the authorization is made.

The downward movement of the core 31 is limited by engagement of its lower end with a block 35 seated in a stationary core member 36. The block 35 prevents the conical surface of the lower end of the core 31 from contacting with the sides of a correspondingly shaped hole in the upper end of the stationary core member 36 which might result in the residual magnetism retaining the core 31 in operated position after the solenoid is deënergized.

The date wheels 23 are mounted on the left hand ends of nested sleeves as is well known in the art, and said sleeves carrying at their right hand ends (Fig. 4) knurled disks with the various days, months and years engraved on their respective peripheries to enable the date type wheels to be set to any desired date. The type on the customer's identification plate and the date type carriers is inked by means of an ink ribbon 37 which passes from a spool 38 around a roll 39 around another roll 40 and is received on a spool 41. No mechanism is shown or described for feeding the ink ribbon or reversing the same as this mechanism is well known in the art and any suitable form thereof may be used with the present invention. The advantages to the auditing department of having the correct name and address printed on the sales slip are plain. It prevents any confusion of one customer with another due to an error by the clerk in writing the name and also insures that the delivery man will have correct information. A punching mechanism is also provided for making perforations in the sales slip to indicate to the office that the sale was authorized.

It is usual when the goods purchased are left by the customer for delivery by the store to send a delivery slip with the goods to the delivery department, the delivery slip having the address and any other desired information. In order to notify the delivery department that the sale has been authorized punching means is provided for perforating the delivery slip. The advantage of having the customer's correct name and address printed on the delivery slip by the stamping device is very apparent. The perforations for indicating that the credit sale has been authorized are made by suitable punches carried by a punch head adapted to slide in the plate 24 and operated by a punch arm 43 which is pivoted at 44, its right hand end being slotted over a pin in the bottom of the punch head and its left hand end also being slotted to engage the pin 30 carried by the core 31 of the solenoid 32. It can be seen from Fig. 3 that when the solenoid is energized by the credit authorizer and the core is drawn down to its lowered position the arm 43 will be rocked counter-clockwise on its pivot 44 and thereby raise the punch head and cause the delivery slip to be perforated thereby. The details of the punching mechanism are neither shown nor described herein and reference may be had to the hereinbefore mentioned patent. A metal box 85 is mounted on the plate 24 and is adapted to receive the punchings. This box 85 is fastened to the plate 24 only by the screw 71 so that it may be easily detached for emptying.

Mechanism is provided to make it impossible to energize the solenoid 32 until a sales slip and a customer's identification plate have been inserted in the machine. The mechanism for accomplishing this will now be described. Fast in a block 46 are two spring contacts 47 and 48 which are normally open. A lever 49 is pivoted in the plate 24, the lower end of said lever engaging the contact 48 while the upper end projects slightly above the plate 24. When the sales slip is inserted under the frame 22 it strikes the lever 49 and rocks the same on its pivot thereby raising the contact 48 until it engages the contact 47.

On the opposite side of the plate 24 is a block 50 (Fig. 4) similar to the block 46 and carrying spring contacts 51 and 52 normally open. A lever 53 is pivoted near its center to the frame 22 and at one end is bent to engage the underside of the contact 51. When the customer's identification plate 27 is inserted in the machine it strikes the opposite end of the lever 53 and rocks the lever slightly thereby raising the contact 51 into engagement with the contact 52.

A full description of the electric circuits which control the operation of the telephone and stamping device is given in the before mentioned Dorsey and Kirshner patent and reference can be made thereto if desired.

The only circuit which it is thought necessary to describe herein is the one for energizing the solenoid 32. This circuit is as follows. From the generator, through a switch 80 at the credit authorizer's desk (see the hereinbefore mentioned patent), wire 60, terminal 61, wire 62, wire 63, contact 51, contact 52, these being the contacts closed by the insertion of the customer's identification plate 27, wire 64, contacts 47 and 48, closed by insertion of the sales slip, wire 65, solenoid 32, wire 66, wire 67, terminal 68, and common negative wire 69 back to the generator. When a slip and customer's plate are inserted properly the pairs of contacts 47 and 48, and 51 and 52 will be closed and the circuit for energizing the solenoid 32 will be in condition to be closed by the switch 80 at the credit authorizer's desk.

It is apparent from the above that the circuit for energizing the solenoid and thereby stamping and punching the sales slip cannot be closed until both a sales slip and a customer's identification plate are inserted in the stamping device. As pointed out above, this makes it impossible for anyone except the customer having the identification plate or his authorized representative to obtain credit.

While the form of mechanism herein shown and described, is admirably adapted to fulfil the objects primarily stated, it is to be understood that it is not intended to confine the invention to the one form of embodiment herein disclosed, for it is susceptible of embodiment in various forms all coming within the scope of the claims which follow.

What is claimed is:—

1. In a store system, the combination of a marking device, a controlling means therefor, and a plurality of means located in the marking device whereby the controlling means is normally ineffective.

2. In a store system, the combination of a marking device, a normally inoperative controlling means therefor, and a plurality of means located in the marking device operable for rendering the controlling means operative.

3. In a store system, the combination of a marking device, actuating means therefor, normally ineffective controlling means for the actuating means, and a plurality of other means operable for rendering the controlling means operative.

4. In credit slip authorizing apparatus, the combination of means for printing on an inserted slip, actuating means therefor, electrically operated means for controlling the actuating means, means for normally disabling the controlling means, and an insertible type carrier, the insertion of which in combination with a sales slip, in the printing means renders the controlling means effective.

5. In credit slip authorizing apparatus, the combination of a marking device, actuating means therefor, controlling means for the actuating means, a type plate adapted to be inserted in the marking device, means whereby the controlling means is normally ineffective, and means whereby the insertion of a sales slip and the type plate in the marking device renders the controlling means effective.

6. In credit slip authorizing apparatus, the combination of a marking device, actuating means controlled by an electric circuit, two pairs of spring contacts, normally open, in the circuit for controlling the actuating means, a type carrying plate adapted to be inserted in the marking device, the insertion of said plate closing one of the before mentioned spring contacts, and means whereby the insertion of a sales slip in the marking device closes the other of said spring contacts so that when an electric current passes through the circuit the actuating means for the marking device will be operated.

7. In a device of the class described, the combination of an inking and impression means, an insertible type plate, and supporting means for holding said plate in printing position, and having a sight opening whereby said printing plate may be viewed.

8. In a device of the class described, the combination of inking and impression means, an insertible type plate bearing type on one face for printing certain information, said plate being further constructed that the same information will appear on the reverse side in reading form, and supporting means for holding said plate in printing position, and having a sight opening whereby the information on said reverse side may be viewed.

9. In a device of the class described, the combination of inking and impression means, an insertible type plate, supporting means for holding said plate in printing position, and having a sight opening whereby said printing plate may be viewed, and means for preventing an operation of the impression means when a printing plate is not in proper printing position.

10. In a device of the class described, the combination of inking and impression means, an insertible type plate bearing type on one face for printing certain information, said plate being further constructed that the same information will appear on the reverse side in reading form, supporting means for holding said plate in printing position, and having a sight opening whereby the information on said reverse side may be viewed, and means for preventing an operation of the impression means when a printing plate is not in proper printing position.

11. In a device of the class described, the combination of an inking and impression means, an insertible type plate bearing type on one face for printing certain information, said plate having the same information on the reverse side in reading form, and supporting means for holding said plate in printing position, and having a sight opening whereby the information on said reverse side may be viewed.

12. In a device of the class described, the combination of inking and impression means, an insertible type plate bearing type on one face for printing certain data, said plate being further constructed that the same data will appear on the reverse side in reading form, and supporting means for holding said plate in printing position.

13. In a device of the class described, the combination of inking and impression means, an insertible type plate, supporting means for holding said plate in printing position, and means for preventing an operation of the impression means when a printing plate is not in proper printing position.

14. In a device of the class described, the combination of inking and impression means, an insertible type plate bearing type on one face for printing certain data, said plate being further constructed that the same data will appear on the reverse side in reading form, supporting means for holding said plate in printing position, and means for preventing an operation of the impression means when a printing plate is not in proper printing position.

15. In a marking device, the combination of impression means, electro-magnetic means for actuating the impression means, and a circuit including a plurality of switches operable in a normal operation of the device.

16. In a marking device, the combination of impression means, an insertible type plate coöperating therewith, electro-magnetic means for actuating said impression means, and a circuit including a plurality of switches operable in a normal operation of the device.

17. In a marking device, the combination of impression means, an insertible type plate, electro-magnetic means for actuating the impression means to take an impression from said insertible type plate, an electric circuit for controlling the electro-magnetic means, a switch located in said circuit and adapted to be operated to close said circuit, and a plurality of switches also located in said circuit whereby said first mentioned switch is rendered normally ineffective.

18. In a marking device, the combination of impression means, an insertible type plate, electro-magnetic means for actuating the impression means to take an impression from said insertible type plate, an electric circuit for controlling the electro-magnetic means, a switch located in said circuit and adapted to be operated to close said circuit, a plurality of normally open switches also located in said circuit whereby said first mentioned switch is rendered normally ineffective, and means whereby the insertion of said insertible type plate and a sales slip will close said second mentioned switches.

In testimony whereof I affix my signature.

ARTHUR C. KIRSHNER.